(12) United States Patent
Gururaj

(10) Patent No.: US 10,482,149 B2
(45) Date of Patent: Nov. 19, 2019

(54) METHOD AND SYSTEM FOR CLASSIFICATION OF WEB BROWSING HISTORY

(71) Applicant: Wipro Limited, Bangalore (IN)

(72) Inventor: Suraj Gururaj, Bangalore (IN)

(73) Assignee: Wipro Limited, Bangalore (IN)

( * ) Notice: Subject to any disclaimer, the term of this patent is extended or adjusted under 35 U.S.C. 154(b) by 340 days.

(21) Appl. No.: 15/464,999

(22) Filed: Mar. 21, 2017

(65) Prior Publication Data
US 2018/0260491 A1 Sep. 13, 2018

(30) Foreign Application Priority Data
Mar. 9, 2017 (IN) .............................. 201741008293

(51) Int. Cl.
*G06F 16/00* (2019.01)
*G06F 16/955* (2019.01)
*G06F 16/11* (2019.01)

(52) U.S. Cl.
CPC .......... *G06F 16/955* (2019.01); *G06F 16/128* (2019.01)

(58) Field of Classification Search
CPC .... G06F 16/955; G06F 16/353; G06F 16/355; G06F 16/38
See application file for complete search history.

(56) References Cited

U.S. PATENT DOCUMENTS

| 6,460,060 B1 | 10/2002 | Maddalozzo, Jr. et al. | |
| 9,189,562 B2 | 11/2015 | Nakano et al. | |
| 9,378,281 B2 | 6/2016 | Melton et al. | |
| 2007/0220441 A1* | 9/2007 | Melton ................ | G06F 16/955 715/781 |
| 2009/0248678 A1* | 10/2009 | Okamoto .............. | G06F 16/355 |
| 2014/0280166 A1* | 9/2014 | Bryars .................. | G06F 16/285 707/738 |

OTHER PUBLICATIONS

Gururaj et al., "Efficient Manageability and Intelligent Classification of Web Browsing History Using Machine Learning", World Academy of Science, Engineering and Technology International Journal of Computer and Information Engineering vol. 3, No. 8, 2016.

* cited by examiner

*Primary Examiner* — Grace Park
(74) *Attorney, Agent, or Firm* — Pepper Hamilton LLP

(57) ABSTRACT

The present disclosure relates to method and computing device for classification of web browsing history by classification system. The classification system receives web browsing history from web browser associated with user, where web browsing history comprises details about one or more web pages browsed by user, extracts one or more keywords from each of one or more web pages browsed by user based on trained keyword dataset, determines a plurality of classifications for each of the one or more web pages based on one or more keywords, generates relevancy matrix between one or more keywords of web pages and corresponding plurality of classifications and identifies a classification from plurality of classifications for each of one or more webpages based on relevancy matrix, where snapshot of classification is stored in non-volatile storage unit of web browser. The use of non-volatile storage unit in present disclosure provides no restriction on storage space.

18 Claims, 6 Drawing Sheets

METHOD AND SYSTEM FOR CLASSIFICATION OF WEB BROWSING HISTORY

This application claims the benefit of Indian Patent Application Serial No. 201741008293, filed Mar. 9, 2017, which is hereby incorporated by reference in its entirety.

TECHNICAL FIELD

The present subject matter is related in general to classification system, more particularly, but not exclusively, to a method and system for classification of web browsing history.

BACKGROUND

Over years, the World Wide Web (WWW), which is a collection of interconnected and cross-linked web pages, has become an important source of information for every field. Users may employ applications known as web browsers for accessing these web pages. As users frequently access same web pages repeatedly, most of the web browsers may keep a track of the web pages that the user has previously accessed using a history list. Generally, the history list may track previously accessed web pages in the order of the time that the web pages were viewed. Although the browsing activity gets tracked, the manageability aspect and classification of web browsing history is very poor.

Today, there are many ways of classifying and managing the web browsing history. However, at present, it is very difficult to search the webpage from the entire history of webpages, especially when there is a huge array of browsing history present. Most of the existing classification techniques fail to provide the web classification in a user-friendly manner along with fast access to such data. In addition, many a times, such solutions may lack in performance because of the way in which such solutions are implemented. In most of the existing solutions, proper classification can be obtained only through user interactions. Also, the classification in such system may be performed by frequency, label and metatag. In such scenario, there is no guarantee that any important web pages visited in the past can be easily accessible. This makes the retrieval of information from the browsing history very challenging.

Today, some of the existing techniques classify the browsing history into most relevant categories automatically without any user's intervention. However, the usage of cookies information, which is the web browsed history of the web browsers, as part of snapshotting is restricted to what the user searches, since the storage space is minimal in cookies. As and when the user searches different web pages, indexes keep building up and cookies may run out of space. Thus, the existing techniques today do not provide an efficient classification and judicial usage of the memory space and improved performance with respect to time. Hence, there is a need for efficient and intelligent classification of the web browsing history for the users.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of classification of web browsing history, the method comprising receiving the web browsing history from a web browser associated with a user. The web browsing history comprises details about one or more web pages browsed by the user. The method comprises extracting one or more keywords from each of the one or more web pages browsed by the user based on a trained keyword dataset, determining a plurality of classifications for each of the one or more web pages based on the one or more keywords, generating a relevancy matrix between each of the one or more keywords of the one or more web pages and the corresponding plurality of classifications and identifying a classification from the plurality of classifications for each of the one or more webpages based on the relevancy matrix, wherein a snapshot of the classification is stored in a non-volatile storage unit of the web browser.

In an embodiment, the present disclosure relates to a classification system for classification of web browsing history. The classification system comprises a processor and a memory communicatively coupled to the processor, wherein the memory stores processor executable instructions, which, on execution, may cause the classification system to receive the web browsing history from a web browser associated with a user. The web browsing history comprises details about one or more web pages browsed by the user. The classification system extracts one or more keywords from each of the one or more web pages browsed by the user based on a trained keyword dataset, determines a plurality of classifications for each of the one or more web pages based on the one or more keywords, generates a relevancy matrix between each of the one or more keywords of the one or more web pages and the corresponding plurality of classifications and identifies a classification from the plurality of classifications for each of the one or more webpages based on the relevancy matrix. A snapshot of the classification is stored in a non-volatile storage unit of the web browser.

In an embodiment, the present disclosure relates to a non-transitory computer readable medium including instructions stored thereon that when processed by at least one processor may cause a classification system to receive the web browsing history from a web browser associated with a user. The web browsing history comprises details about one or more web pages browsed by the user. The instruction causes the processor to extract one or more keywords from each of the one or more web pages browsed by the user based on a trained keyword dataset, determine a plurality of classifications for each of the one or more web pages based on the one or more keywords, generate a relevancy matrix between each of the one or more keywords of the one or more web pages and the corresponding plurality of classifications and identify a classification from the plurality of classifications for each of the one or more webpages based on the relevancy matrix. A snapshot of the classification is stored in a non-volatile storage unit of the web browser.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
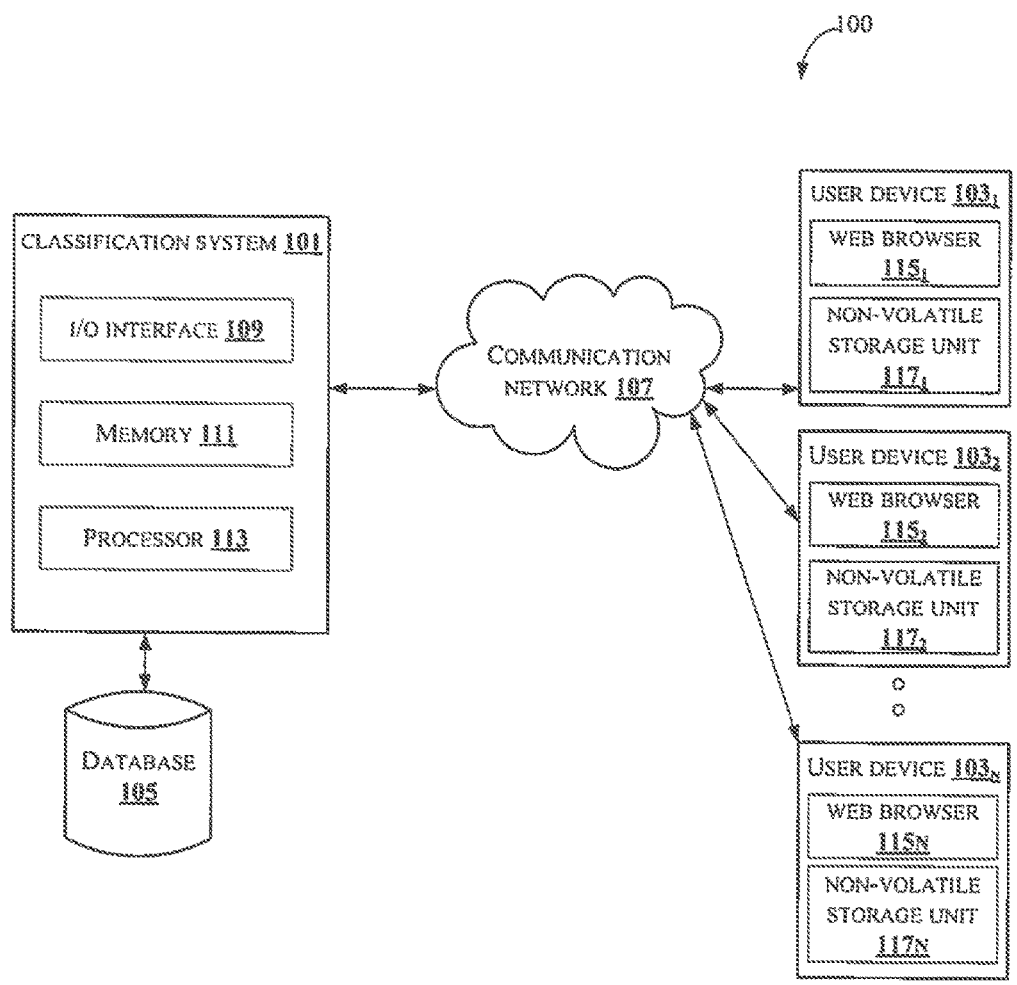
FIG. 1 illustrates an exemplary environment for classification of web browsing history in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure may relate to a method and a classification system for classification of the web browsing history. In an embodiment, the present invention provides an efficient manageability of users browsing history by using machine learning and natural language processing techniques. To classify the web browsing history of the user, whenever a user browses anything on the web browser, the classification system receives the web browsing history browsed by the user from the web browser of the user. The web browsing history comprises details about one or more web pages browsed by the user. In an embodiment, the web browsing history is received at pre-defined intervals of time. The web browsing history of the user is processed to identify one or more keywords for one or more web pages. Based on the one or more keywords, the classification system determines a plurality of classification for each of the web pages. From the plurality of classifications, the classification system identifies a classification for the one or more web pages based on a relevancy matrix, where the relevancy matrix is generated between each of the one or more keywords of the one or more web pages and the corresponding plurality of classifications. The classification system stores a snapshot of the classification identified in a non-volatile storage unit of the web browser. In the present disclosure, the significance of adding an efficient storage unit for manageability of users browsing history to web browsers, ensures efficient and quick information retrieval from browsing history. The present invention provides a non-volatile storage unit which stores the classification of the web pages without any user intervention. This guarantees no information is lost and increases productivity by saving time which is spent revisiting websites of more importance. Also, memory storage provided in the present invention is more when compared to the existing system which makes use of cache memory in the web browser.

FIG. 1 illustrates an exemplary environment for classification of web browsing history in accordance with some embodiments of the present disclosure.

As shown in FIG. 1, the environment 100 comprises a classification system 101 connected through a communication network 107 to a user device 1031, a user device 1032, . . . and a user device 103N (collectively referred to as plurality of user devices 103). The classification system 101 may also be connected to a database 105. In an embodiment, the plurality of user devices 103 may be utilized by users for accessing plurality of websites. In an embodiment, the plurality of user devices 103 may include, but are not limited to, a laptop, a desktop computer, a Personal Digital Assistant (PDA), a notebook, a smartphone, a tablet and any other computing devices. The user device 1031 comprises a web browser 1151 and a non-volatile storage unit 1171. Similarly, the user device 1032, . . . user device 103N comprises respective web browsers and non-volatile storage unit. The web browsers of the plurality of user devices 103 are collectively referred as plurality of web browsers 115 of the plurality of user devices 103. In an embodiment, the plurality of web browsers 115 are application downloaded on the plurality of user devices 103, which may retrieve, provide and display one or more web page information from Internet. web. The non-volatile storage unit of the plurality of user devices 103 are collectively referred as plurality of non-volatile storage units 117. In an embodiment, the plurality of non-volatile storage units 117 are used for storing information related to classification of the web browsing history. In an embodiment, the information stored on the plurality of non-volatile storage units 117 may not be allowed for modification by the users. The classification system 101 provides a classification for each of the web pages being accessed by the users. In an embodiment, the classification system 101 may include, but are not limited to, a laptop, a desktop computer, a Personal Digital Assistant (PDA), a notebook, a smartphone, a tablet and any other computing devices. When user of the plurality of user devices 103 browses for a particular link or content, the web browsing history from the web browser of the user device may be provided to the classification system 101. The web browsing history comprises details about one or more web pages browsed by the user. The details of the one or more web pages are stored in the database 105. In an embodiment, the details about the one or more web pages may include, but are not limited to, metadata of the web page, data regarding header, Uniform Resource Locator (URL), title and time stamp of the one or more web pages browsed by the user. A person skilled in the art would understand that any other details of the web pages, not mentioned explicitly, may also be included in the present disclosure. In an embodiment, the classification system 101 receives the web browsing history from the web browser at pre-defined time intervals. On receiving the details about one or more web pages, the classification system 101 extracts one or more keywords for each of the web pages browsed by the user. In an embodiment, the one or more keywords are extracted based on a trained keyword dataset, which is identified by using machine learning and feature extraction technique. Once the one or more keywords are extracted, the classification system 101 determines a plurality of classifications for each of the one or more web pages. In an embodiment, the plurality of classifications associated with each of the one or more webpages are determined by identifying common characteristics between the one or more keywords and parameters of each web browsing path using a trained classification dataset. The trained classification dataset comprises one or more classification identified previously based on the web browsing history of the user. The classification system 101 identifies a classification for each of the one or more web pages based on a relevancy matrix, where the relevancy matrix is generated by calculating a cosine similarity score between each of the one or more keywords of the one or more web pages and the corresponding plurality of classifications. The classification identified for the one or more web pages are stored as a snapshot in the non-volatile storage unit of the web browser of the user. In an embodiment, snapshot of the classification comprises details about the time stamp, the URL, the title, the cosine similarity score and the relevancy matrix for each of the one or more web pages. In an embodiment, the classification system 101 may identify a classification for the one or more web pages browsed by the user based on the snapshot of the classification stored in the non-volatile storage unit of the web browser of the user. Snapshotting the classification information in the non-volatile storage unit helps in classification of any new web history data and fast retrieval of the web history data.

The classification system 101 comprises an I/O Interface 109, a memory 111 and a processor 113. The I/O interface 109 may be configured to receive the web browsing history from the web browser associated with the user. The I/O interface 109 may also receive one or more user defined keywords from the user.

The received information from the I/O interface 109 is stored in the memory 111. The memory 111 is communicatively coupled to the processor 113 of the classification system 101. The memory 111 also stores processor instructions which cause the processor 113 to execute the instructions for classification of web browsing history.

Figure 2A:
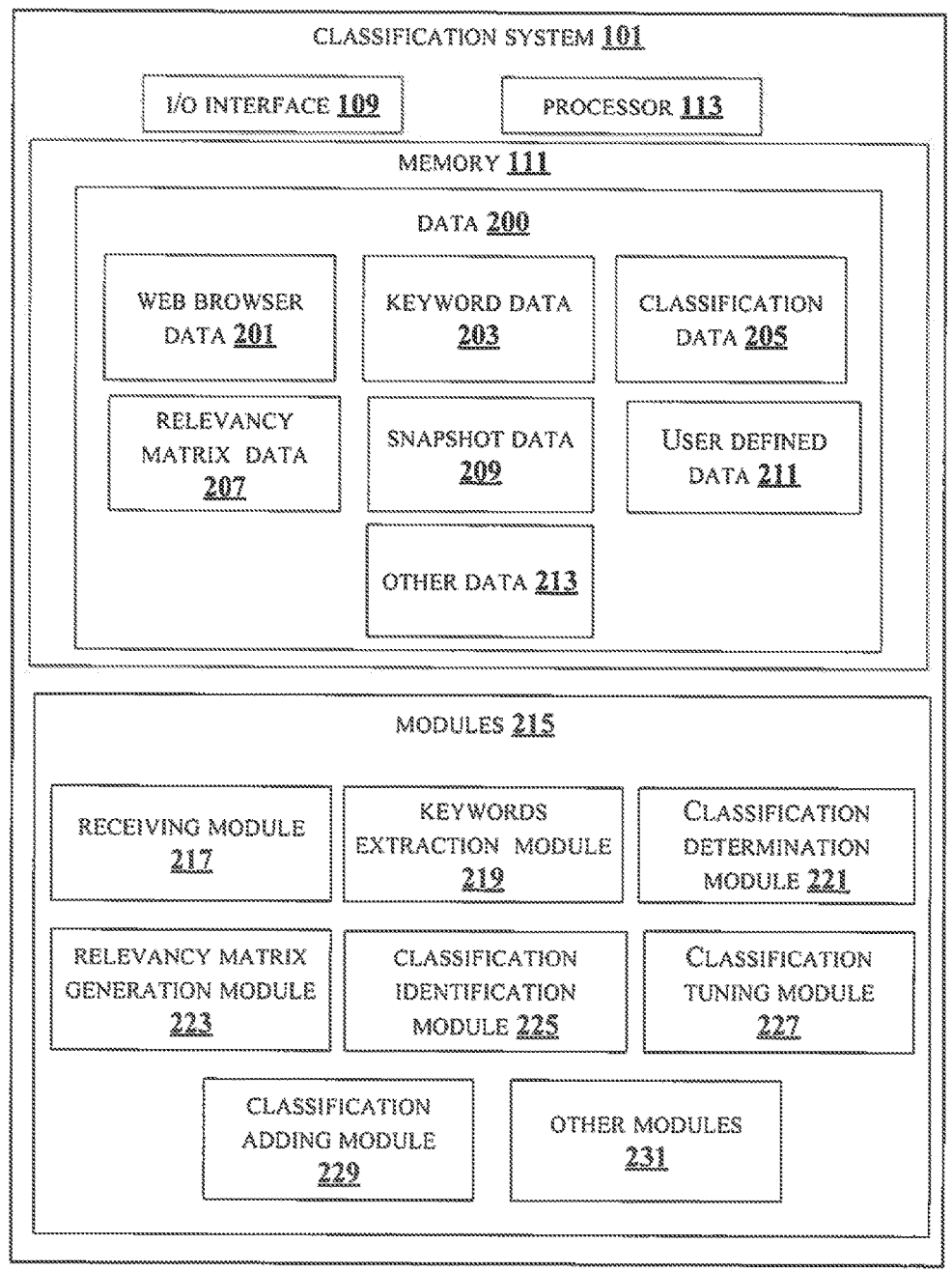
FIG. 2a shows a detailed block diagram of a classification system in accordance with some embodiments of the present disclosure.

FIG. 2a shows a detailed block diagram of a classification system in accordance with some embodiments of the present disclosure.

Data 200 and one or more modules 215 of the classification system 101 are described herein in detail. In an embodiment, the data 200 comprises web browser data 201, keyword data 203, classification data 205, relevancy matrix data 207, snapshot data 209, user defined data 211 and other data 213.

The web browser data 201 may comprise the web browsing history received from the web browser of the user. The web browsing history comprises details about one or more web pages accessed by the user. The details about the one or more web pages include, but are not limited to, metadata of the web page, data regarding header, Uniform Resource Locator (URL) details, title and time stamp details of the one or more web pages browsed by the user. A person skilled in the art would understand that any other details of the web pages may also be considered in the present disclosure.

The keyword data 203 may comprise details about the one or more keywords extracted from the one or more web pages browsed by the user. The keyword data 203 may also comprise a plurality of training web page dataset which may be used for training a keyword extraction model. Further, the keyword data 203 may comprise the trained keyword dataset which are determined during the training of the plurality of training web page dataset. For example, if the user uses a web page "www.youtube.com", one of the keyword extracted may be YouTube.

The classification data 205 may comprise the plurality of classifications determined for the web pages browsed by the user. In an embodiment, the plurality of classifications associated with the one or more web pages may be determined by using Naïve Bayes classification along with a trained classification dataset. A person skilled in the art would understand that the classifications may use any other classification technique, not explicitly mentioned in the present disclosure. Further, the plurality of classifications may be determined by identifying common characteristics between the one or more keywords, ontology between the one or more keywords and parameters of each web browsing path. In an embodiment, the trained classification dataset comprises one or more classification identified previously based on the web browsing history of the user.

The relevancy matrix data 207 may comprise details about the relevancy matrix generated between each of the one or more keywords of the one or more web pages and the corresponding plurality of classifications. In an embodiment, the relevancy matrix may be generated by calculating the cosine similarity score between the one or more keywords of the one or more web pages and the corresponding plurality of classifications.

The snapshot data 209 may comprise the snapshot of the classification associated with one or more web pages, which are stored in the non-volatile storage unit of the web browser of the user. In an embodiment, the snapshot of the classification comprises details about the time stamp, the URL, the title, the cosine similarity score and the relevancy matrix for each of the one or more web pages. A person skilled in the art would understand that the snapshot classification details may also comprise other details associated with the classification, not mentioned explicitly in the present disclosure.

The user defined data 211 may comprise user defined keywords which may be provided by the users for adding to the trained keyword dataset. In an embodiment, if some classifications which the users may require are not present in the trained dataset, the users may add the required classifications in the keyword dataset.

The other data 213 may store data, including temporary data and temporary files, generated by the one or more modules 215 for performing the various functions of the classification system 101.

In an embodiment, the data 200 in the memory 111 are processed by the one or more modules 215 of the classification system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

In one implementation, the one or more modules 215 may include, but are not limited to, a receiving module 217, a keywords extraction module 219, a classification determination module 221, a relevancy matrix generation module 223, a classification identification module 225, a classification tuning module 227 and a classification adding module 229. The one or more modules 215 may also comprise other modules 231 to perform various miscellaneous functionalities of the classification system 101. It will be appreciated that such modules 215 may be represented as a single module or a combination of different modules.

The receiving module 217 may receive the web browsing history from the web browser associated with the user. The web browsing history comprises the details of the one or more web pages browsed by the user. The details of the one or more web pages comprises the metadata of the web page, the data regarding header, the Uniform Resource Locator (URL), the title and the time stamp in the one or more web pages browsed by the user. The receiving module 217 may also receive one or more keywords from the users for adding to the trained keyword dataset.

The keywords extraction module 219 (also referred as keywords extraction model) may extract one or more keywords for each of the one or more web pages browsed by the user. In an embodiment, the keywords extraction module 219 is trained previously using the plurality of training web page dataset. The keywords extraction module 219 extracts one or more keywords for the one or more web pages by analyzing the details of the one or more web pages such as, the metadata of the web page, the data regarding header, the Uniform Resource Locator (URL), the title and the time stamp. In an embodiment, the keywords extraction module 219 utilizes feature analysis and deep machine learning technique to identify the one or more keywords. In an embodiment, the keywords extraction module 219 extracts one or more keywords by tokenizing the URL of each of the web pages. In another embodiment, the keywords extraction module 219 may implement semantic analysis for identifying the one or more keywords. In one another embodiment, the keywords extraction module 219 utilizes Hypertext Markup Language (HTML) unit of the one or more web pages to analyze the metadata associated with each of the webpages.

The classification determination module 221 may determine the plurality of classification for each of the one or more web pages browsed by the users. In an embodiment, the classification determination module 221, utilizes Naive Bayes Classification along with the trained classification dataset for determining the plurality of classifications. A person skilled in the art would understand that, any other classification technique, not mentioned explicitly for determining the classification may also be used in the present disclosure. The trained classification dataset comprises one or more classification identified previously based on the web browsing history of the user. The classification determination module 221 may determine the plurality of classification associated with each of the one or more web pages by identifying common characteristics among one or more keywords extracted, parameters of each of the web browsing path and ontology between the one or more keywords. The plurality of classification associated with each of the one or more webpages are determined by identifying common characteristics between the one or more keywords and parameters of each web browsing path using a trained classification dataset.

The relevancy matrix generation module 223 may generate a relevancy matrix between each of the one or more keywords of the one or more web pages and the corresponding plurality of classifications. The relevancy matrix generation module 223 generates the relevancy matrix by calculating the cosine similarity score between the one or more keywords of the one or more web pages and the corresponding plurality of classifications. In an embodiment, the pages with the cosine similarity score of more than a pre-defined number are categorized under a particular classification. Table 1 below illustrate an exemplary relevancy matrix in accordance with the present disclosure. The relevancy score is calculated with a threshold value of cosine similarity score as greater and equal to 0.5. For example, rows of the relevancy matrix indicate number of iterations and columns of the relevancy matrix indicate web pages to be classified. The relevancy matrix generation module 223 calculates the cosine similarity score for the trained dataset with new dataset. Based on the calculated result, a score of one is allotted, if the score exceeds the threshold value or a score of zero is allotted, if the score is less than the threshold value. In an embodiment, the scores with value one are eligible for classification and scores with value zero are rejected as the match are not found with the trained dataset.

TABLE 1

| SERIAL NUMBER | URL | KEYWORD | COSINE SIMILARITY SCORE | RELEVANCE |
|---|---|---|---|---|
| 1 | Youtube.com | YouTube | 0.97 | Yes |
| 2 | Facebook.com | Facebook | 0.99 | Yes |
| 3 | Sas.com | Cloud | 0.004 | No |
| 4 | Ndtv.com | Modi | 0.45 | No |

As shown in the Table 1, the cosine similarity score for the keywords "YouTube" and "Facebook" is greater than 0.5 and the cosine similarity score for the keywords "cloud" and "Modi" is less than 0.5. Thus, the relevancy matrix is generated as [1100].

The classification identification module 225 may identify a classification for each of the one or more webpages from the plurality of classification determined, based on the relevancy matrix generated between each of the one or more keywords of the one or more web pages and the corresponding plurality of classifications. Further, the classification identification module 225 stores the snapshot of the classification in the plurality of non-volatile storage units 117 of the plurality of web browsers 115 of the users.

Figure 2B:
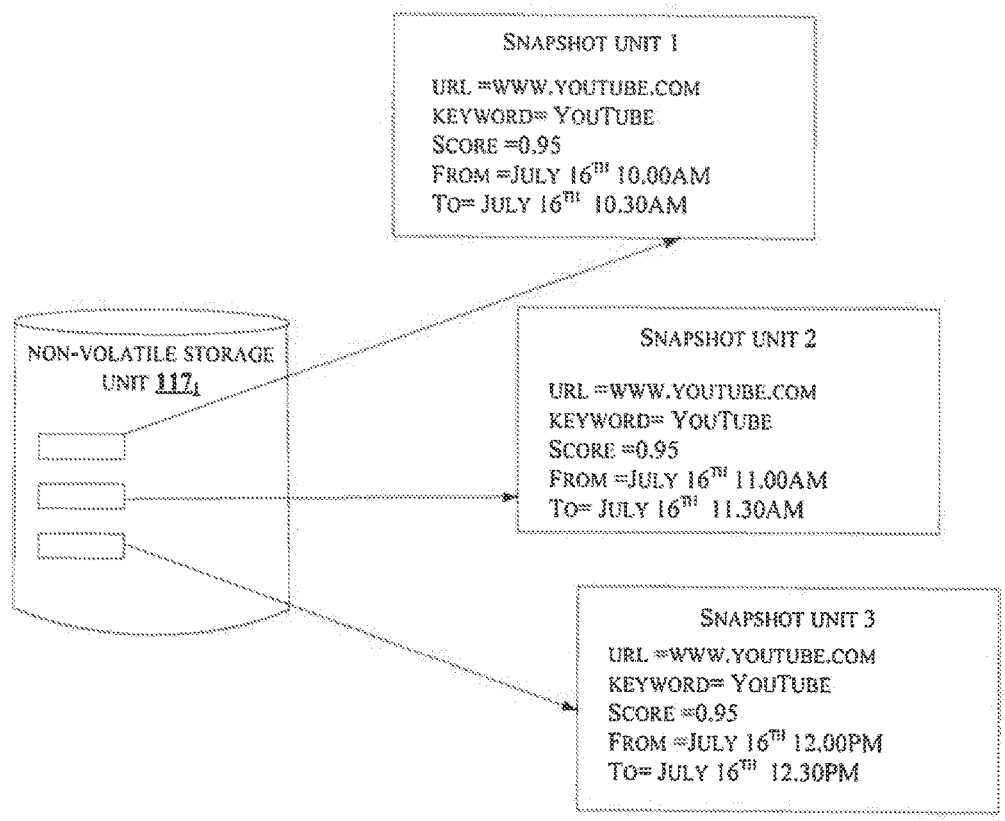
FIG. 2b shows an exemplary representation of snapshot stored in a non-volatile storage unit in accordance with some embodiments of the present disclosure.

FIG. 2b shows an exemplary representation of snapshot stored in a non-volatile storage unit in accordance with some embodiments of the present disclosure. FIG. 2b illustrates the non-volatile storage unit 1171 of the user device 1031. In an embodiment, the information in the snapshot unit is taken as of a moment in time. The snapshot units comprise URL, keyword, score for the web page and time duration during which the web page is used. In case, if the browser session ends, the web history of the web browser get stored in the non-volatile storage units 117 of the plurality of web browsers 115. In an embodiment, the term snapshot refers to the state of the web browser at an instance of time. The snapshot of the classification comprises details about the time stamp, the URL, the title, the cosine similarity score and the relevancy matrix for each of the one or more web pages.

In an embodiment, the snapshot of the classification is used in classification of any new data item in the web browsing history. In an embodiment, if the user repeatedly uses same webpages, the URL details of those webpages gets saved in the non-volatile storage unit of the associated web browser, with the cosine similarity score of, for example, one or very close to one.

With reference to FIG. 2a, the classification tuning module 227 may be used to refine the classification identified, using feedback to the classification identification module 225. In an embodiment, the classification tuning module 227 uses keyword recall technique based on user interaction to update the relevancy matrix. The user interaction provides information regarding the number of successfully and unsuccessfully retrieved web page to determine the efficiency of the classification. Based on the success rate of the retrieval, the relevancy matrix is altered. In an embodiment, the user interaction refers to a search performed by the users by providing a query on the classified web browsing history. Further, the keyword recall measures a ratio between the number of web pages retrieved in response to a given query and a number of relevant documents present against the query. In an embodiment, if the number of retrieved web pages increases, then the classification is correctly identified. In another embodiment, if the number of retrieved web pages for the query is less, the classification tuning module 227 compares the classification with the trained classification dataset.

The classification adding module 229 may add the one or more keywords to the trained keyword dataset. In an embodiment, the classification adding module 229 identifies the one or more user defined keywords and adds to the keyword dataset.

Figure 3:
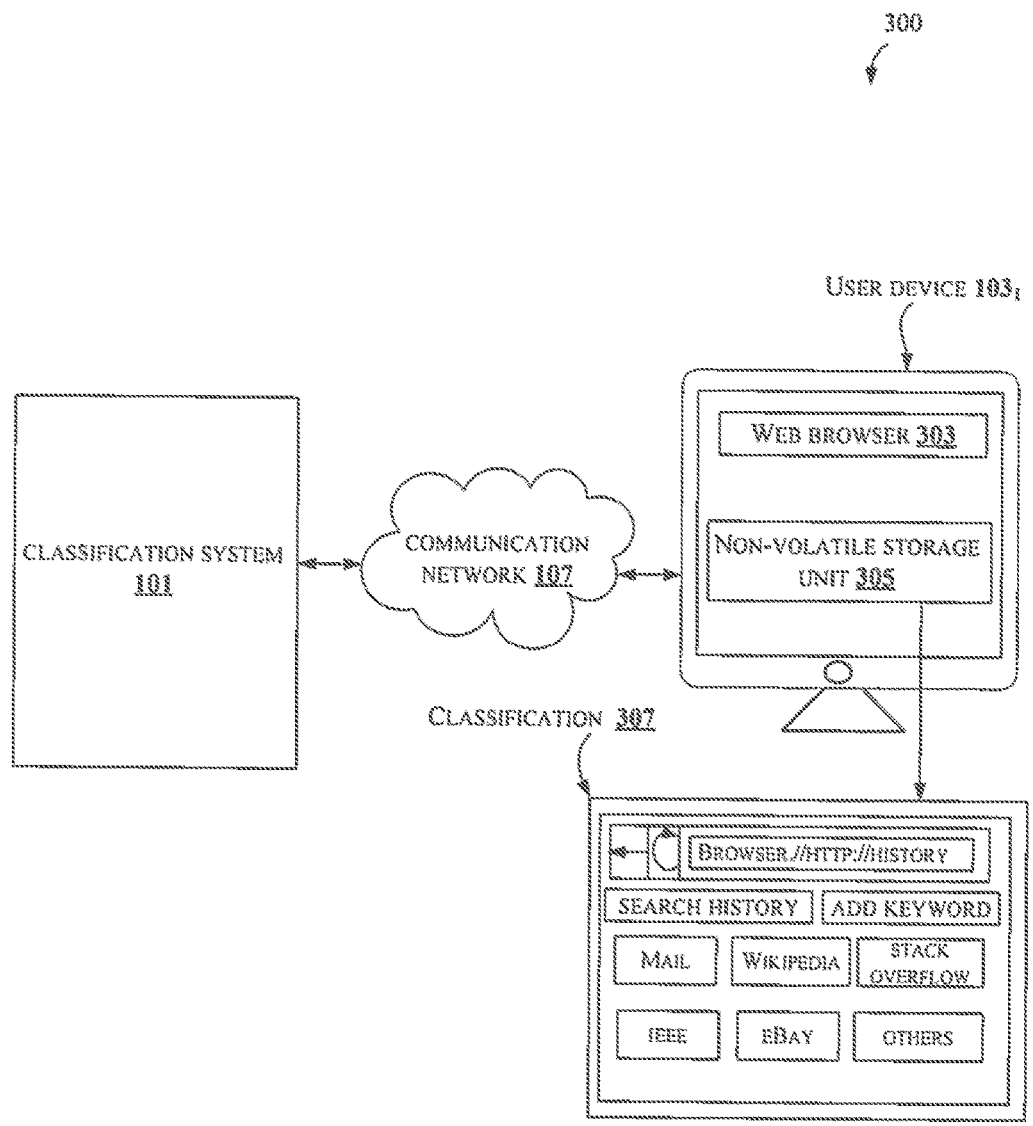
FIG. 3 shows an exemplary representation of classifying web browsing history in accordance with some embodiments of the present disclosure.

FIG. 3 shows an exemplary representation of classifying web browsing history in accordance with some embodiments of the present disclosure.

As shown in FIG. 3, the environment 300 illustrates a scenario of classifying web browsing history on a computer device in an exemplary embodiment of the present disclosure. The environment 300 illustrates the classification system 101 connected through the communication network 107 to a user device 1031, i.e., a computer device associated with a user as shown in the FIG. 3. A person skilled in the art would understand that FIG. 3 is an exemplary embodiment and the present disclosure may also include plurality of user devices 103. The user device 1031 may comprise a web browser 303 and a non-volatile storage unit 305. Initially, the user associated with the user device 1031 may browse the web using the web browser 303. The web browsing history from the web browser 303 may be received by the classification system 101. A person skilled in the art would understand that there may be a plurality of user devices 103 providing the web browsing history to the classification system 101. On receiving the web browsing history, the classification system 101 may extract the one or more keywords from one or more web pages identified from the web browsing history. For instance, the user may have browsed an application for viewing emails, or an e-commerce website and the like. Based on the keywords extracted, the plurality of classifications are determined for the browsed web pages. For example, if the user has browsed emails, one of the classification determined may be mails. Once, the plurality of classifications are determined, the relevancy between the keywords of the web pages and the plurality of classification my be determined and a classification may be identified based on the relevancy. The classification identified for the web pages are stored as the snapshot classification in the non-volatile storage unit 305. A classification 307 of the web pages is shown in FIG. 3. Based on the web pages browsed, the classification 307 may comprise six fields of classifications namely, mails, Wikipedia, stackoverfow, IEEE, eBay and others. In addition, the classification 307 may also comprise a search history field and an add keyword field.

Figure 4:
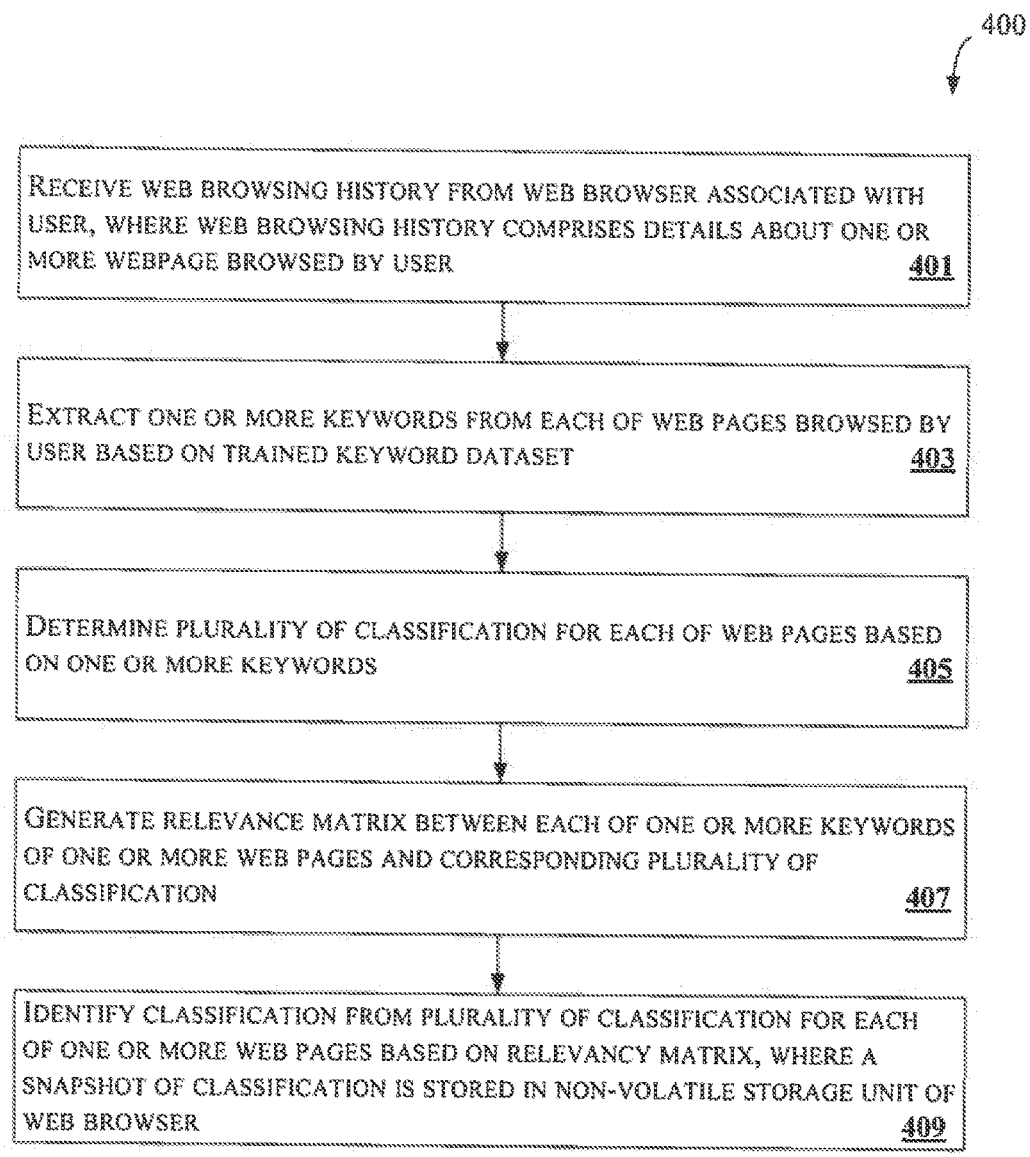
FIG. 4 illustrates a flowchart showing a method of classification of web browsing history in accordance with some embodiments of present disclosure.

FIG. 4 illustrates a flowchart showing a method of classification of web browsing history in accordance with some embodiments of present disclosure.

As illustrated in FIG. 4, the method 400 comprises one or more blocks for classification of web browsing history. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, receiving by the receiving module 217, the web browsing history from the web browser associated with the user. The web browsing history comprises details about one or more web pages browsed by the user.

At block 403, extracting by the keywords extraction module 219, the one or more keywords from each of the one or more web pages browsed by the user based on the trained keyword dataset. In an embodiment, the trained keyword dataset is identified by using machine learning technique. The keywords extraction module 219 receives the details about the one or more web pages and analyses the details based on the trained keyword dataset.

At block 405, determining by the classification determination module 221, the plurality of classifications for each of the one or more web pages based on the one or more keywords. The classification determination module 221 determines the plurality of classifications associated with each of the one or more webpages by identifying common characteristics between the one or more keywords and parameters of each web browsing path using a trained classification dataset.

At block 407, generating by the relevancy matrix generation module 223, the relevancy matrix between each of the one or more keywords of the one or more web pages and the corresponding plurality of classifications. The relevancy matrix is generated by the relevancy matrix generation module 223 by calculating the cosine similarity score between the one or more keywords of the one or more web pages and the corresponding plurality of classifications.

At block 409, identifying by the classification identification module 225, the classification from the plurality of classifications for each of the one or more webpages based on the relevancy matrix. The snapshot of the classification is stored in the non-volatile storage unit of the web browser.

Figure 5:
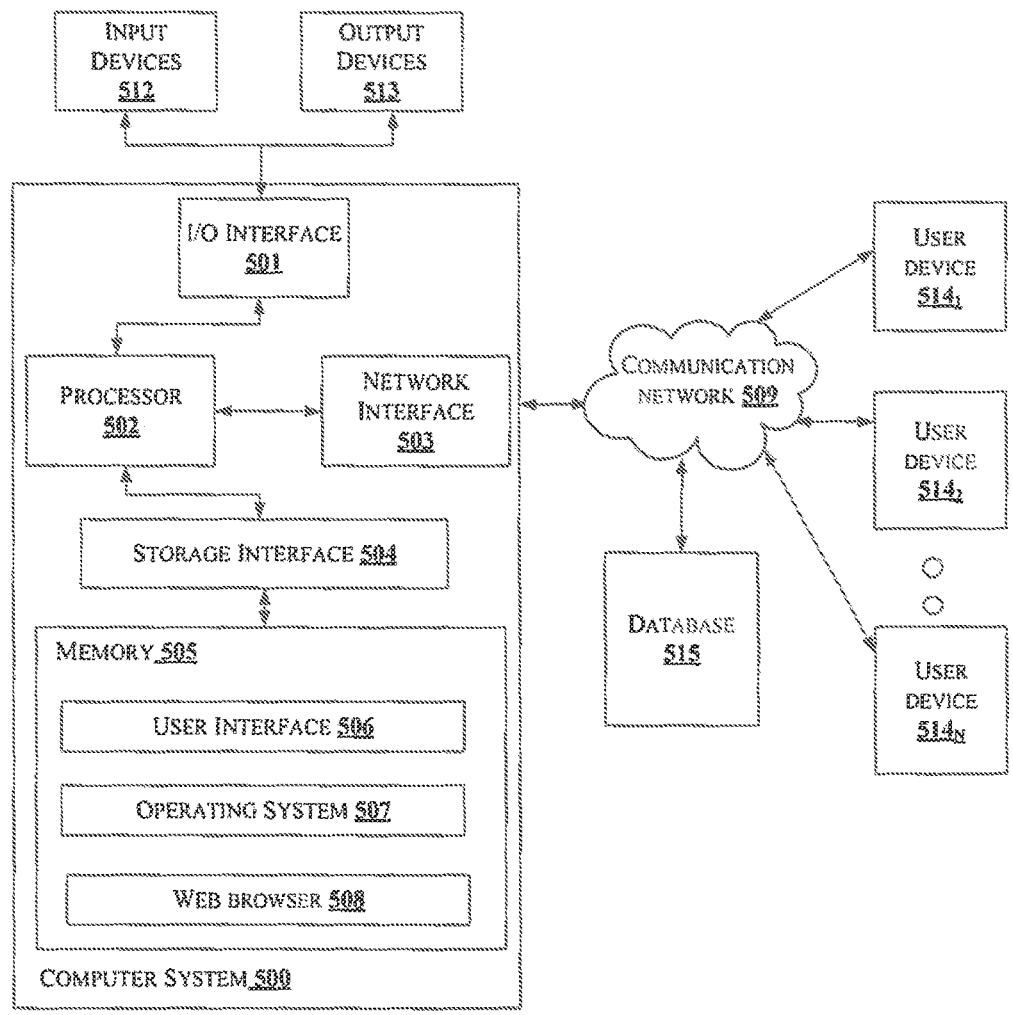
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the classification system 101. The computer system 500 may comprise a central processing unit ("CPU" or "processor") 502. The processor 502 may comprise at least one data processor for classification of web browsing history. The processor 502 may include speciald processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of a classification system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a user device 5141, a user device 5142 . . . and a user device 514N and a database 515. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provides efficient and quick information retrieval from browsing history.

The present disclosure provides eliminates loss of information from web browsing history.

The present disclosure provides the non-volatile storage unit which has no restriction on storage space.

An embodiment of the present disclosure provides increased productivity in web classification by saving time spent on revisiting/searching websites.

An embodiment of the present disclosure provides snapshotting of classification, which helps in classifying any new data item in the web access history based on the snapshotted information. The snapshotting helps in avoiding duplicate data classification, thereby improving performance.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for classification of web browsing history, the method comprising:

receiving, by a classification computing device, the web browsing history from a web browser associated with a user, wherein the web browsing history comprises details about one or more web pages browsed by the user;

extracting, by the classification computing device, one or more keywords from each of the one or more web pages browsed by the user based on a trained keyword dataset;

determining, by the classification computing device, a plurality of classifications for each of the one or more web pages based on the one or more keywords, wherein the plurality of classifications associated with each of the one or more webpages are determined by identifying common characteristics between the one or more keywords and parameters of each web browsing path using a trained classification dataset;

generating, by the classification computing device, a relevancy matrix between each of the one or more keywords of the one or more web pages and the corresponding plurality of classifications; and identifying, by the classification computing device, a classification from the plurality of classifications for each of the one or more webpages based on the relevancy matrix, wherein a snapshot of the classification is stored in a non-volatile storage unit of the web browser.

2. The method as claimed in claim 1, further comprising identifying a classification for the one or more web pages browsed by the user based on the snapshot of the classification stored in the non-volatile storage unit of the web browser.

3. The method as claimed in claim 1, wherein the details about the one or more web pages comprises metadata of the web page, data regarding header, Uniform Resource Locator (URL), title and time stamp in the one or more web pages browsed by the user.

4. The method as claimed in claim 1, wherein the web browsing history is received from the web browser at pre-defined time intervals.

5. The method as claimed in claim 1, wherein extracting the one or more keywords comprises:
providing, by the classification system, the details about the one or more web pages to a trained keyword extraction model, wherein the trained keyword extraction model is trained using a plurality of training web page dataset; and
extracting, by the classification system, the one or more keywords for each of the one or more web pages based on analysis of the trained keyword extraction model.

6. The method as claimed in claim 1, wherein the trained classification dataset comprises one or more classification identified previously based on the web browsing history of the user.

7. The method as claimed in claim 1 further comprising adding a user defined keyword to the trained keyword dataset.

8. The method as claimed in claim 1, wherein the relevancy matrix is generated by calculating a cosine similarity score between the one or more keywords of the one or more web pages and the corresponding plurality of classifications.

9. The method as claimed in claim 1, wherein the snapshot of the classification comprises details about time stamp, URL, title, cosine similarity score and relevancy matrix for each of the one or more web pages.

10. A classification computing device comprising:
a processor; and
a memory communicatively coupled to the processor, wherein the memory stores processor instructions, which, on execution, causes the processor to:
receive the web browsing history from a web browser associated with a user, wherein the web browsing history comprises details about one or more web pages browsed by the user;
extract one or more keywords from each of the one or more web pages browsed by the user based on a trained keyword dataset;
determine a plurality of classifications for each of the one or more web pages based on the one or more keywords, wherein the plurality of classifications associated with each of the one or more webpages are determined by identifying common characteristics between the one or more keywords and parameters of each web browsing path using a trained classification dataset;
generate a relevancy matrix between each of the one or more keywords of the one or more web pages and the corresponding plurality of classifications; and
identify a classification from the plurality of classifications for each of the one or more webpages based on the relevancy matrix, wherein a snapshot of the classification is stored in a non-volatile storage unit of the web browser.

11. The classification computing device as claimed in claim 10, wherein the processor identifies a classification for the one or more web pages browsed by the user based on the snapshot of the classification stored in the non-volatile storage unit of the web browser.

12. The classification computing device as claimed in claim 10, wherein the details about the one or more web pages comprises metadata of the web page, data regarding header, Uniform Resource Locator (URL), title and time stamp in the one or more web pages browsed by the user.

13. The classification computing device as claimed in claim 10, wherein the processor receives the web browsing history from the web browser at pre-defined time intervals.

14. The classification computing device as claimed in claim 10, wherein the processor extracts the one or more keywords by:
providing the details about the one or more web pages to a trained keyword extraction model, wherein the trained keyword extraction model is trained using a plurality of training web page dataset; and
extracting the one or more keywords for each of the one or more web pages based on analysis of the trained keyword extraction model.

15. The classification computing device as claimed in claim 10, wherein the trained classification dataset comprises one or more classification identified previously based on the web browsing history of the user.

16. The classification computing device as claimed in claim 10, wherein the processor generates the relevancy matrix by calculating a cosine similarity score between the one or more keywords of the one or more web pages and the corresponding plurality of classifications.

17. The classification computing device as claimed in claim 10, wherein the snapshot of the classification comprises details about time stamp, URL, title, cosine similarity score and relevancy matrix for each of the one or more web pages.

18. A non-transitory computer readable medium including instruction stored thereon that when processed by at least one processor cause a classification computing device to perform operations comprising:
receiving the web browsing history from a web browser associated with a user, wherein the web browsing history comprises details about one or more web pages browsed by the user;
extracting one or more keywords from each of the one or more web pages browsed by the user based on a trained keyword dataset;
determining a plurality of classifications for each of the one or more web pages based on the one or more keywords, wherein the plurality of classifications associated with each of the one or more webpages are determined by identifying common characteristics between the one or more keywords and parameters of each web browsing path using a trained classification dataset;

generating a relevancy matrix between each of the one or more keywords of the one or more web pages and the corresponding plurality of classifications; and identifying a classification from the plurality of classifications for each of the one or more webpages based on the relevancy matrix, wherein a snapshot of the classification is stored in a non-volatile storage unit of the web browser.

* * * * *